United States Patent Office 3,501,507
Patented Mar. 17, 1970

3,501,507
PHOTODIMERS OF Δ⁴,⁹-STEROIDS
Manuel Debono, Indianapolis, Ind., assignor to Eli Lilly and Company, Indianapolis, Ind., a corporation of Indiana
No Drawing. Filed Sept. 6, 1968, Ser. No. 758,104
Int. Cl. C07c *169/22, 171/08*
U.S. Cl. 260—397.4          2 Claims

---

Photodimers of 3-keto Δ⁴,⁹-steroids are produced by ultraviolet irradiation. The compounds are useful as hormones or anti-hormones.

---

BACKGROUND OF THE INVENTION

Photodimers of two steroidal heteroannular conjugated dienones are known. Rubin et al., J. Org. Chem. 29, 68 (1964), and Throndson et al., Helv. Chim. Acta, 45, 2342 (1962), prepared a photodimer from Δ⁶-testosterone. Rubin et al., Tetrahedron Letters 1075 (1964), prepared a photodimer from gona-3,5-dien-7-on-17-ol, wherein it was suggested that the high degree of specificity observed in the photodimerization of the above heteroannular dienones resulted mainly from the specific environment of the dienone system rather than from any characteristic inherent property of the dienone, in that the site of the attack of the second steroid is the double bond furthest removed from the ketone group. In both instances, this double bond is the least sterically hindered of the two double bonds.

It is an object of this invention to prepare photodimers of conjugated dienones of a type not heretofore employed as substrates for this reaction and which have a γ,δ-double bond which is more sterically hindered than the α,β-double bond of the dienone chromophore.

SUMMARY OF THE INVENTION

This invention provides novel photodimers produced by the action of ultraviolet light on 3-keto Δ⁴,⁹-steroids, according to the following reaction scheme:

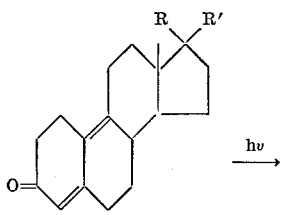

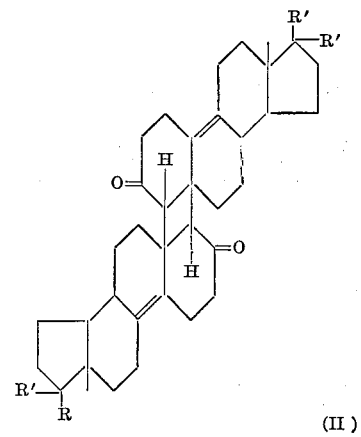

wherein R and R' are chosen from the group pairs consisting of hydrogen and hydroxyl, ethylnyl and hyroxyl, vinyl and hyroxyl, methyl and hydroxyl, ethyl and hydroxyl, propyl and hydroxyl, α-hyroxyethyl and hydrogen, and acetyl and hydrogen.

The above reaction is carried out by dissolving the 3-keto Δ⁴,⁹-steroid (I) in an inert solvent (inert to the action of ultraviolet light as well as chemically nonreactive) and irradiating the solution under a nitrogen atmosphere with ultraviolet light. Ultraviolet light of wave length about 3550 A. is preferred. Yields of dimeric products upwards of 60 percent based on recovered starting material are obtained using isolation and purification procedures are well known in the art.

The novel photodimers represented by Formula II above are useful as hormones or anti-hormones. For example, the photodimers in which R is ethyl and R' hydroxy, in which R is methyl and R' hydroxy, or in which R is hydrogen and R' hydroxy (those derived from 17α-ethyl - 19-nor-4,9(10) - androstadien - 17β-ol-3-one; 17α-methyl - 19-nor-4,9(10) - androstadien-17β-ol-3-one and 19-nor-4,9(10) - androstadien - 17β-ol-3-one) like testosterone, display a highly potent anabolic activity but are without parallel androgenic activity. In addition, a compound according to Formula II above in which R is methyl and R' hydroxy is a potent antiestrogen. Furthermore, the compound according to Formula II in which R is ethynyl and R' hydroxy is a progestational agent.

These compounds can be employed in the same way that testosterone, progesterone etc. have been used in the past as anabolic agents, progestational agents, male sex hormones, etc.

The photodimers of this invention most probably have the anti-structure represented by Formula II above, although it is possible that they have a syn-structure. The best evidence for a symmetrical anti-structure lies in the fact that the C-18 methyl signal is in the nuclear magnetic resonance spectrum is a sharp singlet indicating that both C-18 methyl groups are equivalent.

The cyclobutyl protons in this photodimer, as illustrated in Formula II for the anti form, are also probably symmetrically oriented, since their nmr signals appear as a two proton singlet. In the alternative syn form (which cannot be rigorously excluded), this symmetry requirement can be fulfilled only by placing both these protons on the same side of the cyclobutane ring.

This invention is further illustrated by the following specific examples:

EXAMPLE 1

Bis(17β-hydroxy-3-oxo-estr-9(10)-ene-4,5′,5,4′-diyl)

1 g. of 4,9(10)-estradien-3-on-17β-ol was dissolved in 500 ml. t-butanol and the solution irradiated for about 2.5 hours in a quartz photochemical reactor equipped with 16 ultraviolet lamps emitting at a 3550 A. wave length. During the irradiation, a stream of purified nitrogen was passed over the reaction. The solvent was removed by evaporation in vacuo. The resulting residue containing the dimer [bis(17β-hydroxy-3-oxo-estr-9(10)-ene-4,5′,5,4′-diyl] formed in the above reaction was treated with 200 ml. of boiling diethyl ether and filtered, the starting dienone being preferentially dissolved by the ether. The resulting filter cake was twice recrystallized from acetone to yield crystalline bis[17β-hydroxy-3-oxo-estr-9(10)-ene-4,5′,5,4′-diyl] melting at about 183–184° C. The product showed only end adsorption in the ultraviolet portion of the spectrum and only saturated carbonyl adsorption in the infrared portion of the spectrum, thereby confirming the above structure. Heating the material to its melting point regenerated the starting dienone.

*Analysis.*—Calcd (percent): C, 79.37; H, 8.88. Found (percent): C, 79.14; H, 8.80.

Employing the above procedure, the following $\Delta^{4,9(10)}$-steroids are converted into the corresponding dimer of Formula II above:

17α - ethylestra - 4,9(10) - dien-3-on-17β-ol→bis(17α-ethyl-17β-hydroxy-3-oxo-estr-9(10)-en-4,5′,5,4′-diyl), 17α - methylestra - 4,9)10)-dien-3-on-17β-ol→bis(17α-methyl-17β-hydroxy-3-oxo-estr-9(10)-en-4,5′,5,4′-diyl), 17α - ethinylestra - 4,9(10)-dien-3-on-17β-ol→bis(17α-ethinyl-17β-hydroxy-3-oxo-estr-9(10)-en-4,5′,5,4′-diyl), 19 - nor - pregna-4,9(10)-diene-3,20-dione→bis(19-nor-3,20-dioxo-pregn-9(10)-en-4,5′,5,4′-diyl), 17β - (α - hydroxyethyl)estra-4,9(10)-dien-3-one→bis-[17β-(α-hydroxyethyl)-3-oxo-estr-9(10-en-4,5′,5,4′-diyl], 17α - n-propylestra-4,9(10)-dien-3-on-17β-ol→bis(17α-n-propyl-17β-hydroxy-3-oxo-estr-9(10)-en-4,5′-5,4′-diyl).

I claim:
1. A dimer of a 3-keto $\Delta^{4,9}$-steroid, said dimer having the following structure:

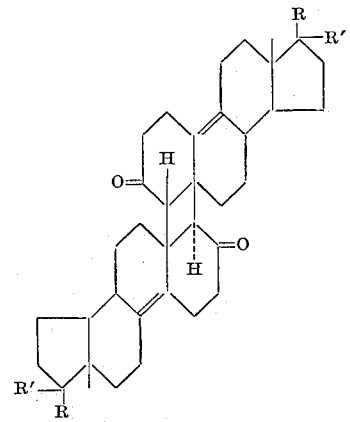

wherein R and R′ are chosen from the group pairs consisting of hydrogen and hydroxyl, ethynyl and hydroxyl, vinyl and hydroxyl, methyl and hydroxyl, ethyl and hydroxyl, propyl and hydroxyl, α-hydroxyethyl and hydrogen, and acetyl and hydrogen.

2. A compound according to claim 1, said compound being bis(17β - hydroxy - 3-oxo-estr-9(10)-ene-4,5′,5,4′-diyl).

No references cited.

ELBERT L. ROBERTS, Primary Examiner